United States Patent
Bachmann et al.

(10) Patent No.: US 10,648,887 B2
(45) Date of Patent: May 12, 2020

(54) METHODS FOR EVALUATING THE LUBRICATION OF AN APPARATUS WHICH CAN BE LUBRICATED BY MEANS OF A LUBRICANT CIRCUIT

(71) Applicant: MAN Truck & Bus AG, München (DE)

(72) Inventors: Johannes Bachmann, Stein (DE); Enrico Börner, Leinburg (DE)

(73) Assignee: MAN TRUCK & BUS AG, München (DE)

( * ) Notice: Subject to any disclaimer, the term of this patent is extended or adjusted under 35 U.S.C. 154(b) by 90 days.

(21) Appl. No.: 15/907,880

(22) Filed: Feb. 28, 2018

(65) Prior Publication Data
US 2018/0246010 A1 Aug. 30, 2018

(30) Foreign Application Priority Data
Feb. 28, 2017 (DE) .......................... 10 2017 001 913

(51) Int. Cl.
*G01M 15/09* (2006.01)
*F01M 1/20* (2006.01)
(Continued)

(52) U.S. Cl.
CPC .............. *G01M 15/09* (2013.01); *F01M 1/02* (2013.01); *F01M 1/16* (2013.01); *F01M 1/20* (2013.01); *F01M 11/10* (2013.01); *F01M 2005/008* (2013.01); *F01M 2005/028* (2013.01); *F01M 2011/1446* (2013.01); *F16N 2260/05* (2013.01); *F16N 2260/08* (2013.01);
(Continued)

(58) Field of Classification Search
CPC ...................................... G01M 15/09
USPC ........................ 73/114.56, 114.57
See application file for complete search history.

(56) References Cited

U.S. PATENT DOCUMENTS

| 4,913,108 A | 4/1990 | Sougawa et al. |
| 6,111,499 A | 8/2000 | Morikami |

(Continued)

FOREIGN PATENT DOCUMENTS

| DE | 10035049 A1 | 1/2002 |
| DE | 69817620 T2 | 6/2004 |

(Continued)

*Primary Examiner* — Eric S. McCall
(74) *Attorney, Agent, or Firm* — Weber Rosselli & Cannon LLP (57) ABSTRACT

A method for evaluating the lubrication of friction components of an apparatus which can be lubricated by means of a lubricant circuit. A lubricant pump of the lubricant circuit is drivable by a drive engine. A pressure ascertainment unit continuously ascertains the lubricant pressure at at least one defined region of the lubricant circuit during an engine start procedure. A travel ascertainment unit is provided, by means of which at multiple pressure points in time, at each of which the lubricant pressure ascertained exceeds a defined pressure limiting value ($p_1$, $p_2$, $p_3$), the relative travel between the friction components since the beginning of the engine start procedure is ascertained or estimated, and an analysis unit, by means of which an evaluation value, is ascertained from the total of the relative travel values ($\varphi_1$, $\varphi_2$, $\varphi_3$) ascertained at the pressure points in time.

23 Claims, 3 Drawing Sheets

(51) Int. Cl.
  *F01M 11/10*   (2006.01)
  *F01M 1/16*    (2006.01)
  *F01M 1/02*    (2006.01)
  *F01M 5/00*        (2006.01)
  *F01M 5/02*        (2006.01)
  *G01M 3/32*        (2006.01)

(52) U.S. Cl.
  CPC ...... *F16N 2260/12* (2013.01); *F16N 2260/14* (2013.01); *G01M 3/3209* (2013.01)

(56) References Cited

U.S. PATENT DOCUMENTS

| | | |
|---|---|---|
| 6,732,576 B2 | 5/2004 | Hoshiba et al. |
| 2019/0040773 A1* | 2/2019 | Malischewski .......... F01M 1/06 |

FOREIGN PATENT DOCUMENTS

| | | |
|---|---|---|
| DE | 102006034369 A1 | 3/2007 |
| DE | 102011111353 A1 | 3/2012 |
| DE | 10322529 B9 | 8/2012 |
| DE | 102012009120 A1 | 11/2012 |
| DE | 102012208546 A1 | 12/2012 |
| DE | 102014010888 A1 | 1/2016 |
| DE | 102008007457 B4 | 6/2016 |
| GB | 2491626 A | 12/2012 |

* cited by examiner

METHODS FOR EVALUATING THE LUBRICATION OF AN APPARATUS WHICH CAN BE LUBRICATED BY MEANS OF A LUBRICANT CIRCUIT

BACKGROUND

1. Technical Field

The present disclosure relates to methods for evaluating the lubrication of friction components, which rub against one another, of an apparatus which can be lubricated by means of a lubricant circuit.

2. Description of Related Art

On an internal combustion engine having pressure-feed lubrication, providing a lubricant pump which is mechanically decoupled from a crankshaft of the internal combustion engine, and is electrically drivable in particular, is known, by means of which during a start procedure of the internal combustion engine, a sufficient lubricant pressure in the entire lubrication system and therefore a sufficient filling of all lubrication points with lubricant can be ensured even before the startup of the internal combustion engine. Wear of the internal combustion engine is thus effectively counteracted. In particular in vehicles having a so-called stop-start mechanism, such a mechanically decoupled "pre-lubricating" lubricant pump is advantageous, since the number of the startup procedures per operating hour generally significantly increases with a stop-start mechanism.

A method for start-stop operation of a motor vehicle is known from DE 100 35 049 A1, for example, in which the motor vehicle has an internal combustion engine as a traction drive source. Moreover, the vehicle has at least one lubricant pump here for lubricant for the lubrication of parts of the internal combustion engine and an electronic start-stop control unit. The lubricant pump is automatically driven here in a stop phase of the start-stop control unit as a function of the shutdown point in time of the internal combustion engine, beginning by way of an electric motor. In this manner, defects on parts of the internal combustion engine are to be counteracted simply and effectively.

A lubricant pump drivable using an additional electric drive is typically more costly than a lubricant pump drivable using an internal combustion engine provided in any case, so that the use of an electrically driven lubricant pump is also regularly omitted. If an electrically driven lubricant pump is omitted, to avoid a disproportionate wear of the bearings, which are exclusively lubricated during the startup of the internal combustion engine using the residual lubricant remaining from the previous operation, it is important that the lubrication system rapidly builds up a sufficiently high lubricant pressure at all lubrication points during an engine start.

Measuring the present lubricant pressure by means of a pressure sensor and comparing it to a defined pressure limiting value, for example, is known for monitoring the lubricant pressure of an internal combustion engine. If the measured present lubricant pressure falls below the defined pressure limiting value in this case, a warning signal is typically output by means of a warning apparatus, for example, a warning light, to an operator of the internal combustion engine or to a driver of a vehicle having the internal combustion engine, respectively. However, such a comparison of a measured lubricant pressure to a defined pressure limiting value is not suitable for determining the quality of the lubricant pressure buildup during an engine start procedure in the comparatively short time period of the pressure buildup (approximately 1 second) during the startup of the internal combustion engine.

SUMMARY

One of the objects of the present disclosure is therefore to provide methods for automated evaluation of the lubrication of friction components, which rub against one another, of an apparatus which can be lubricated by means of a lubricant circuit, by means of which the lubrication of the friction components, in particular during an engine start procedure, can be evaluated in a simple manner with increased accuracy.

One aspect of the present disclosure is directed to a method for evaluating the lubrication of components or friction components, which rub against one another, of an apparatus which can be lubricated by means of a lubricant circuit, in particular an internal combustion engine or an automatic transmission, wherein a lubricant pump of the lubricant circuit can be driven by means of a drive engine forming the apparatus or by means of a drive engine driving the apparatus, in particular an automatic transmission. According to the present disclosure, a pressure ascertainment unit is provided, by means of which during an engine start procedure, in which lubricant pressure is built up by means of the lubricant pump of the lubricant circuit, lubricant pressure is continuously ascertained at at least one defined region or point of the lubricant circuit. Furthermore, according to the present disclosure, a travel ascertainment unit is provided, by means of which at multiple pressure points in time, at each of which the lubricant pressure ascertained by means of the pressure ascertainment unit exceeds a defined pressure limiting value, the relative travel between the friction components since the beginning of the engine start procedure is ascertained and/or estimated. Moreover, according to the present disclosure an analysis unit is also provided, by means of which an evaluation value, which evaluates the lubricant pressure buildup during the engine start procedure and/or represents the quality of the lubricant pressure buildup during the engine start procedure, is ascertained from the total of the relative travel values ascertained at the pressure points in time.

In this manner, the lubrication of the friction components during an engine start procedure can be evaluated simply and/or using little effort with increased accuracy, since now, from the relationship of lubricant pressure and relative travel covered of the friction components at multiple points in time of the engine start procedure, an informative evaluation value is ascertained, by means of which the quality of the lubricant pressure buildup during the engine start procedure is evaluated informatively. This evaluation value, which is preferably scalar, can then be stored, for example, for a later analysis of the pressure buildup of the lubricant circuit with little storage requirement, or used for an immediate function check of the lubricant circuit.

To achieve the above-mentioned object, alternatively a method for evaluating the lubrication of friction components, which rub against one another, of an apparatus which can be lubricated by means of a lubricant circuit, in particular an internal combustion engine or an automatic transmission, is proposed, wherein a lubricant pump of the lubricant circuit can be driven by means of a drive engine forming the apparatus or by means of a drive engine driving the apparatus. According to the present disclosure, a travel ascertainment unit is provided, by means of which, during an engine start procedure, the relative travel between the friction components since the beginning of the engine start procedure is continuously ascertained or estimated. Moreover, according to the present disclosure a pressure ascertainment unit is also provided, by means of which, at multiple travel points in time, at each of which the relative travel ascertained by means of the travel ascertainment unit between the friction parameters exceeds a defined relative travel limiting value, the lubricant pressure is ascertained at at least one defined region of the lubricant circuit. Furthermore, an analysis unit is provided according to the present disclosure, by means of which an evaluation value, which evaluates a lubricant pressure buildup during the engine start procedure, is ascertained from the total of the pressure values ascertained at the travel points in time.

The advantages resulting due to this alternative method according to the present disclosure are identical to the advantages already discussed, so that they will not be repeated at this point.

Furthermore, the concept "engine start procedure" is expressly to be understood here such that the engine start procedure also already comprises the beginning of rotation of the driveshaft of the drive engine. The engine start procedure is therefore also to comprise here, for example, in a drive engine designed as an internal combustion engine, the entire startup process and therefore also the rotational actuation of the internal combustion engine by means of a starter.

If the lubricant pump of the lubricant circuit is driven by means of a drive engine driving the apparatus, it is preferable if the apparatus to be lubricated is formed by a transmission, in particular an automatic transmission, of a vehicle, which is rotationally driven by means of a drive engine of the vehicle.

In one preferred embodiment, the lubricant pump is connected in a torque-transmitting manner to a crankshaft of an internal combustion engine as the drive engine, so that the lubricant pump can at least be rotationally driven by means of the internal combustion engine. In the case of a lubricant pump mechanically coupled to the internal combustion engine in this manner, the evaluation according to the present disclosure of the lubricant pressure buildup during an engine start procedure is particularly relevant.

In one preferred specific embodiment, the travel ascertainment unit is formed by a crank angle ascertainment unit, by means of which the crank angle covered by the crankshaft since the beginning of the engine start procedure is ascertained to ascertain and/or estimate the relative travel between the friction components. The relative travel between the friction components of the apparatus to be lubricated, for example, also between the camshafts and the cylinder head housing of an internal combustion engine as the apparatus to be lubricated, can be estimated simply and effectively via the crank angle covered by the crankshaft. For the evaluation according to the present disclosure of the lubricant pressure buildup, in this case the range 0° to 1000° of crank angle covered since the beginning of the engine start procedure is generally relevant. The crank angle ascertainment unit can be formed, for example, by an incremental crank angle encoder in conjunction with an electronic analysis unit. In the case of a translational relative movement between the friction components, the relative travel between the friction components since the beginning of the engine start procedure can be measured, for example, by means of a suitable measuring unit directly at the friction components.

In one preferred method according to the present disclosure, for the evaluation of the lubricant pressure buildup by means of the analysis unit as a function of the ascertained total, an evaluation value is selected from a defined number of predefined evaluation values forming different evaluation levels. The lubricant pressure buildup during the engine start procedure can thus be evaluated simply and effectively. It is preferably provided in this case that the number of the predefined evaluation values is in a range of 2 to 6. The lubricant pressure buildup can thus be evaluated simply and informatively.

The number of the considered pressure points in time is preferably in a range of 2 to 10 pressure points in time, particularly preferably in a range of 3 to 5 pressure points in time. Using such a number of pressure points in time and therefore also ascertained relative travel values, which are considered for ascertaining the evaluation value, the lubricant pressure buildup during the engine start procedure can be evaluated with little effort and simultaneously high accuracy. In an alternative method, it is preferable if the number of the travel points in time is in a range of 2 to 10, particularly preferably in a range of 3 to 5.

In a further embodiment, the ascertained pressure values and/or the ascertained relative travel values are each weighted by means of a weighting factor before the summation thereof, wherein by means of these weighting factors, the different damage potentials or damage effects at the multiple travel points in time or at the multiple pressure points in time can be taken into consideration for damage of the apparatus due to excessively slow lubricant pressure buildup. Nonlinear damage effects can thus also be taken into consideration in a simple manner and the actual damage of the apparatus due to excessively slow lubricant pressure buildup can be determined.

The ascertained evaluation value may be stored in a storage unit of the analysis unit, in particular permanently and/or so it can be read out by means of a readout device. Thus, for example, during maintenance of the apparatus or in the event of damage to the apparatus, the evaluation values collected over a plurality of engine starts can be analysed and the functionality of the lubricant circuit, in particular the lubricant pump, can be checked. The evaluation values which are collected and stored over a plurality of engine starts can be relevant in particular in warranty cases for this purpose.

The respective ascertained evaluation value is preferably stored for a defined period of time, in particular for a defined number of engine starts, in the storage unit. In this manner, while reducing the storage requirement necessary during the analysis of the stored evaluation values, for example, a gradual wear of the lubricant pump can be reliably recognized. The defined number of engine starts can be in this case, for example, in a range of 800 to 1500 engine starts, in particular approximately 1000 engine starts. Alternatively or additionally, only a part of the evaluation values ascertained for multiple engine starts is permanently stored in the storage unit. Storage space can thus be effectively saved in the case of long-term storage. In this case, the ascertained evaluation values can only be stored in the storage unit, for example, in a defined interval of engine starts, for example, only upon each fourth or fifth engine start.

Furthermore, evaluation values ascertained for multiple engine starts are preferably statistically analysed by means of the analysis unit. Such a statistical analysis can then be used, for example, for the immediate check of the functionality of the lubricant circuit. In this case, the frequency distribution of the evaluation values ascertained for multiple engine starts is preferably ascertained by means of the analysis unit, for example, in the form of a histogram. Such a histogram can be used, for example, in case of damage to discover a frequently inadequate lubricant pressure buildup as the cause of engine damage.

In a further embodiment, the analysis unit has a signalling connection to a warning unit, by means of which an, in particular optical and/or acoustic, warning signal is output independently or automatically to a person operating the apparatus, for example, a driver of a vehicle having the apparatus, or not, as a function of at least one evaluation value ascertained by means of the analysis unit. A person operating the apparatus can thus be reliably informed about an impermissible or inadequate lubricant pressure buildup. By means of the warning unit, for example, in the first case or in the repeated case of inadequate evaluation, a warning signal can be output to the operator. In a simple and effective embodiment, the warning unit can be formed in this case, for example, by a warning light.

In yet a further embodiment, the pressure ascertainment unit is formed by at least one pressure sensor for measuring the lubricant pressure. It is preferably provided in this case that the at least one pressure sensor, viewed in the lubricant flow direction, is arranged downstream of the lubricant pump and upstream of the friction component regions to be lubricated, in particular in a defined vicinity in the region of the lubricant pump. By means of a pressure sensor arranged in this manner, reliable statements can be made about the buildup of the lubricant pressure. Alternatively or additionally, the at least one pressure sensor, in the case of a drive engine designed as an internal combustion engine, can also be arranged in a defined vicinity in the region of a camshaft to be lubricated of the internal combustion engine as the friction component. The pressure conditions in the lubricant circuit can be acquired particularly reliably by means of such a pressure sensor.

Furthermore, a further evaluation value, which evaluates the lubricant pressure decrease during the engine shutdown procedure, is additionally preferably ascertained by means of the analysis unit from the total of relative travel values ascertained during an engine shutdown procedure and/or from the total of pressure values ascertained during an engine shutdown procedure. In this manner, the lubrication of the friction components can also be effectively evaluated, since now the lubricant pressure decrease during an engine shutdown procedure can be evaluated with little effort and high accuracy.

The concept "engine shutdown procedure" is to be understood here such that the engine shutdown procedure also comprises the end of the rotational movement of the driveshaft of the drive engine. The engine shutdown procedure is therefore also to comprise the entire running down process of the drive engine here.

To achieve the above-mentioned object, furthermore a device for carrying out at least one of the methods according to the present disclosure, in particular for a vehicle, is also claimed, comprising a lubricant circuit having a lubricant pump for lubricating an apparatus, in particular an internal combustion engine or an automatic transmission, wherein the lubricant pump can be driven by means of a drive engine forming the apparatus or by means of a drive engine driving the apparatus, wherein a pressure ascertainment unit is provided, by means of which the lubricant pressure can be ascertained at at least one defined region of the lubricant circuit during an engine start procedure, wherein a travel ascertainment unit is provided, by means of which the relative travel between friction components, which are to be lubricated and rub against one another, of the apparatus can be ascertained and/or estimated during the engine start procedure since the beginning of the engine start procedure, wherein an analysis unit is provided, by means of which an evaluation value, which evaluates the lubricant pressure buildup during the engine start procedure, can be ascertained from relative travel values ascertained during the engine start procedure or from pressure values ascertained during the engine start procedure.

Furthermore, a vehicle, in particular a utility vehicle, for carrying out the method according to the present disclosure and/or comprising the device according to the present disclosure is also claimed.

The advantages resulting due to the device according to the present disclosure and the vehicle according to the present disclosure are identical to the already acknowledged advantages of the methods according to the present disclosure, so that they will not be repeated at this point.

The present disclosure and the advantageous embodiments or refinements thereof and also the advantages thereof will be explained in greater detail hereafter solely by way of example on the basis of drawings.

DETAILED DESCRIPTION

Figure 1:
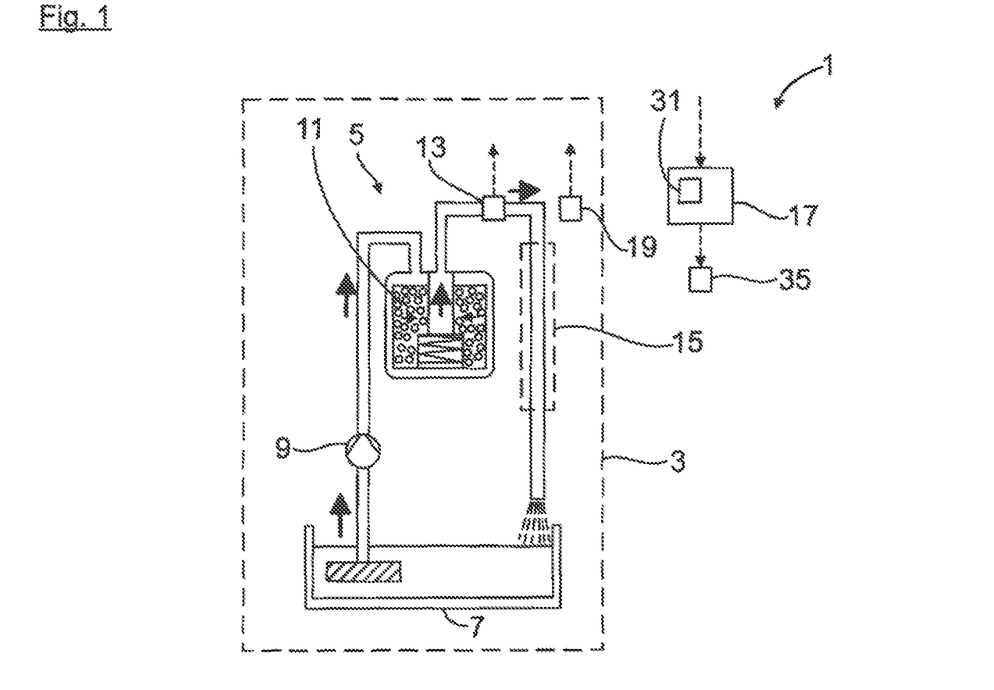
FIG. 1 shows a schematic illustration of the construction of a device according to the present disclosure.

FIG. 1 schematically shows the construction of a device 1 according to the present disclosure. The device 1 has here, for example, an internal combustion engine 3, which is indicated by dashed lines, comprising a lubricant circuit 5. Friction components of the internal combustion engine 3 which rub against one another are lubricated by means of the lubricant circuit 5, so that the wear of these friction components is reduced. By means of the lubricant circuit 5, for example, the camshafts, the crankshaft bearings, the big end bearings, the small end bearings, tappets, and rocker arms of the internal combustion engine are lubricated and/or supplied with lubricant, for example, with lubricant oil here, as friction components.

The internal combustion engine 3 can be associated, for example, with a vehicle (not shown in the figures), so that the internal combustion engine forms a drive engine for driving the vehicle. Alternatively, the internal combustion engine 3 could also, however, be formed by a fixed or stationary internal combustion engine.

As is furthermore shown in FIG. 1, the lubricant circuit 5 has here, viewed in the lubricant flow direction, an oil pan 7, a lubricant pump 9, an oil filter 11, a pressure sensor 13 for measuring the oil pressure, and a lubricating section 15, which is indicated by dashed lines. By means of the lubricant pump 9, the lubricant oil collected in the oil pan 7 is suctioned out of the oil pan 7 and conveyed via the further lubricant circuit. The lubricant pump 9 is connected for this purpose here in a torque-transmitting manner to a crankshaft (not shown in the figures) of the internal combustion engine 3, so that the lubricant pump 9 can be rotationally driven by means of the internal combustion engine 3. The components to be lubricated of the internal combustion engine 3 are supplied with lubricant in the lubricating section 15 of the lubricant circuit 5.

As is furthermore apparent from FIG. 1, the pressure sensor 13 of the internal combustion engine 3 has a signalling connection to an analysis unit 17 of the device 1. The analysis unit 17 can be formed, for example, by a central control unit for controlling the internal combustion engine 3 and further components. Moreover, the analysis unit 17 also has a signalling connection here to a crank angle sensor 19 of the internal combustion engine 3, by means of which the present crank angle of the internal combustion engine crankshaft can be measured. By means of the measurement data of the pressure sensor 13 and the crank angle sensor 19 transmitted to the analysis unit 17, the analysis unit 17 can ascertain evaluation values, by means of which the lubricant pressure buildup during an engine start procedure and also the lubricant pressure decrease during an engine shutdown procedure can be informatively evaluated.

Figure 2:
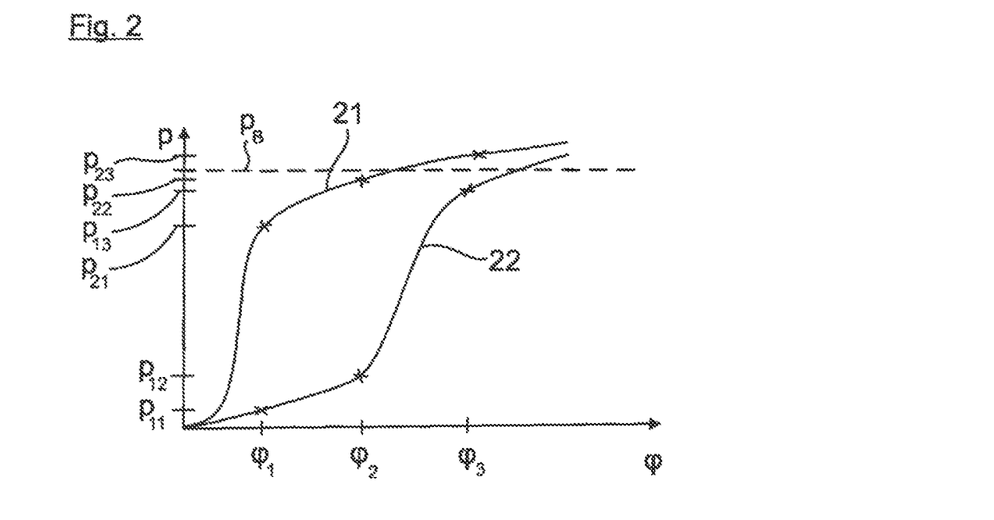
FIG. 2 shows a diagram, on the basis of which a method according to the present disclosure is explained.

FIG. 2 shows a diagram in which two curves 21, 22 are plotted, which are to illustrate a "good" and a "bad" lubricant pressure buildup during an engine start procedure. The curves 21, 22 each show in this case the lubricant pressure p during an engine start procedure as a function of the crank angle $\varphi$ covered since beginning the engine start procedure. The curve 21 shows the "good" lubricant pressure buildup, in which the lubricant pressure p rises significantly more rapidly than in the curve 22, which shows the "bad" lubricant pressure buildup. Moreover, the pressure value $p_B$ is also plotted in the diagram, which is to represent the minimal operating pressure of the lubricant circuit 5. This pressure can be 4 bar in an internal combustion engine, for example.

The ascertainment of an evaluation value for the evaluation of the lubricant pressure buildup during an engine start procedure will be explained in greater detail hereafter on the basis of FIG. 3.

At the beginning of an engine start procedure, which can be acquired, for example, by turning on the ignition of a vehicle having the internal combustion engine, the pressure sensor 13 and the crank angle sensor 19 are activated, so that the present oil pressure and the present crank angle of the internal combustion engine crankshaft are continuously transmitted to the analysis unit 17. The analysis unit 17 then ascertains the crank angle covered by the internal combustion engine crankshaft since the beginning of the engine start procedure via the measurement data of the crank angle sensor 19. In this manner, by means of the analysis unit 17, the relative travel between a plurality of friction components, which rub against one another, of the internal combustion engine 3 since the beginning of the engine start procedure can be estimated with high accuracy.

Subsequently, initially a first travel point in time is ascertained by means of the analysis unit 17 in a step 23 from the measurement data of the crank angle sensor 19, at which the crank angle covered since the beginning of the engine start procedure exceeds a first defined crank angle limiting value $\varphi_1$ (FIG. 2). In a following step 25, the oil pressure at the first travel point in time is then ascertained by means of the analysis unit 17 from the measurement data of the pressure sensor 13. Subsequently, steps 23, 25 are repeated until all travel points in time and the associated oil pressure values are ascertained. Overall, for example, three travel points in time are ascertained here, at each of which the crank angle covered since the beginning of the engine start procedure exceeds a defined crank angle limiting value $\varphi_1$, $\varphi_2$, $\varphi_3$ (FIG. 2). In the case of a lubricant pressure buildup according to curve 21 of FIG. 2, the pressure values $p_{21}$, $p_{22}$, $p_{23}$ corresponding to the three crank angle limiting values $\varphi_1$, $\varphi_2$, $\varphi_3$ are then accordingly ascertained here. In the case of a lubricant pressure buildup according to curve 22 of FIG. 2, the pressure values $p_{11}$, $p_{12}$, $p_{13}$ are ascertained.

Figure 3:
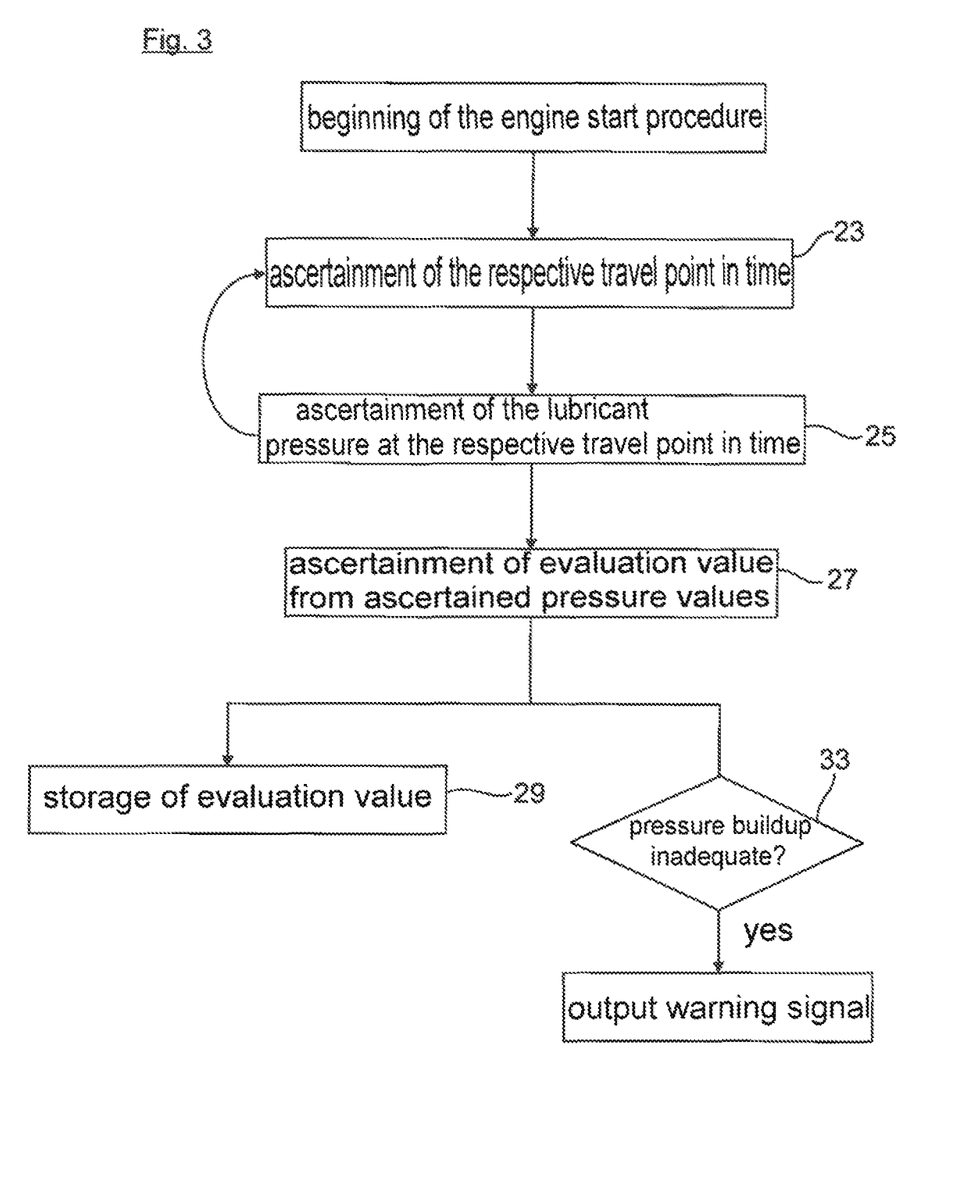
FIG. 3 shows a flow chart, on the basis of which the method is explained.

According to FIG. 3, in a step 27, the evaluation value for evaluating the lubricant pressure buildup during the engine start procedure is then ascertained from the total of the ascertained pressure values. Specifically, the ascertained pressure values are each weighted by means of a weighting factor before the summation thereof here for this purpose. By means of these weighting factors, the different damage potentials at the multiple travel points in time for damage to the internal combustion engine 3 due to excessively slow lubricant pressure buildup are taken into consideration. An evaluation value is then selected by means of the analysis unit 17 from a defined number of predefined evaluation values forming different evaluation levels as a function of the total of the weighted pressure values. In this manner, the quality of the lubricant pressure buildup during the engine start procedure is classified. It is preferably provided in this case that the number of the evaluation levels is in a range of 3 to 6. A higher total value of the weighted pressure values then results here in a more positive evaluation of the lubricant pressure buildup than a lower total value.

Subsequently, in a step 29, the ascertained evaluation value is stored in a storage unit 31 of the analysis unit 17. The evaluation value is stored here such that it can be read out by means of a suitable readout device at a later point in time. In a step 33, it is then moreover checked by means of the analysis unit 17 on the basis of the ascertained evaluation value whether the pressure buildup during the engine start procedure is inadequate or impermissible. If this is the case, a warning unit 35 (FIG. 1) having a signal connection to the analysis unit 17 is independently or automatically activated by means of the analysis unit 17. A warning signal is then output to an operator of the internal combustion engine 3 by means of the warning unit 35. The warning unit 35 can be formed in this case, for example, by a warning light or a loudspeaker.

The ascertainment of an evaluation value for evaluating the lubricant pressure decrease during an engine shutdown procedure takes place in an identical manner, wherein the evaluation value is then ascertained here from the total of crank angle values ascertained during the engine shutdown procedure by means of the analysis unit 17.

Figure 4:
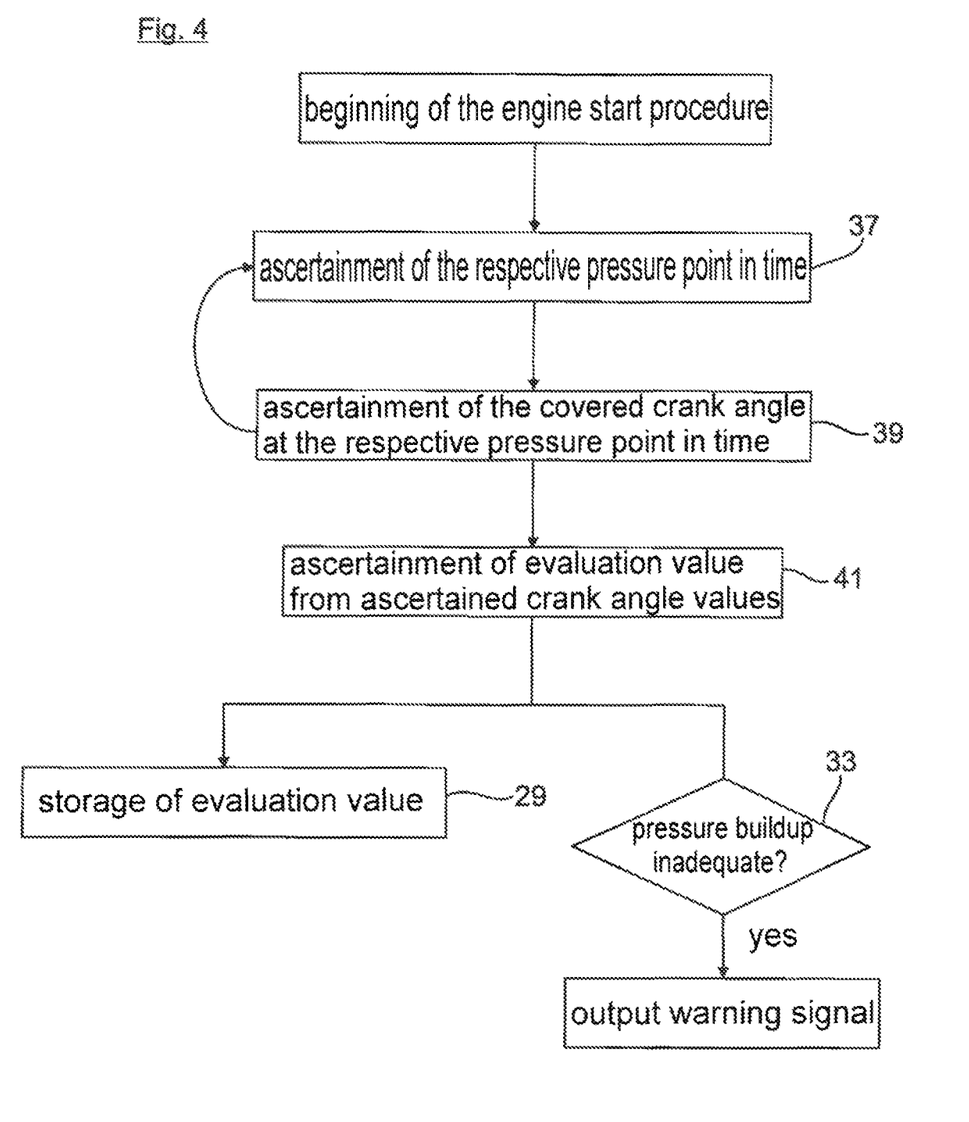
FIG. 4 shows a second embodiment of a method according to the present disclosure in an illustration according to FIG. 3.

FIG. 4 shows a flow chart, on the basis of which a second embodiment of a method according to the present disclosure will be explained hereafter.

In comparison to the method shown in FIG. 3, after the beginning of the engine start procedure, in steps 37, 39, multiple pressure points in time are ascertained here by means of the analysis unit 17 from the measurement data of the pressure sensor 13, at each of which the lubricant pressure measured by means of the pressure sensor 13 exceeds a predefined defined pressure limiting value. Moreover, the crank angle covered since the beginning of the engine start procedure at the respective pressure point in time is ascertained here by means of the analysis unit 17 from the measurement data of the crank angle sensor 19. Subsequently, in a step 41, the evaluation value for evaluating the lubricant pressure buildup during the engine start procedure is ascertained from the total of the ascertained crank angle values. A lower total value of the crank angle values results here in a more positive evaluation of the lubricant pressure buildup than a higher total value.

LIST OF REFERENCE NUMERALS 1 device
3 internal combustion engine
5 lubricant circuit
7 oil pan
9 lubricant pump
11 oil filter
13 pressure sensor
15 lubricating section
17 analysis unit
19 crank angle sensor
21 curve
22 curve
23 step
25 step
27 step
29 step
31 storage unit
33 step
35 warning unit
37 step
39 step
41 step
p pressure
$p_{11}, p_{12}, p_{13}$ pressure limiting value
$p_{21}, p_{22}, p_{23}$ pressure limiting value
$\varphi$ crank angle
$\varphi_1, \varphi_2, \varphi_3$ crank angle limiting value

The invention claimed is:

1. A method for evaluating the lubrication of friction components, which rub against one another, of an apparatus which can be lubricated by means of a lubricant circuit, wherein a lubricant pump of the lubricant circuit is drivable by means of a drive engine forming the apparatus or by means of a drive engine driving the apparatus, comprising:
providing a pressure ascertainment unit, by means of which the lubricant pressure at at least one defined region of the lubricant circuit is continuously ascertained during an engine start procedure,
providing a travel ascertainment unit, by means of which at multiple pressure points in time, at each of which the lubricant pressure ascertained by means of the pressure ascertainment unit exceeds a defined pressure limiting value ($p_1$, $p_2$, $p_3$), the relative travel between the friction components since the beginning of the engine start procedure is ascertained or estimated, and
providing an analysis unit, by means of which an evaluation value, which evaluates the lubricant pressure buildup during the engine start procedure, is ascertained from a total of relative travel values ($\varphi_1$, $\varphi_2$, $\varphi_3$) ascertained at the pressure points in time.

2. The method according to claim 1, wherein the ascertained pressure values or the ascertained relative travel values ($\varphi_1$, $\varphi_2$, $\varphi_3$) are each weighted before the summation thereof by means of a weighting factor, wherein by means of these weighting factors, the different damage potentials at the multiple travel points in time or the multiple pressure points in time for damage of the apparatus due to excessively slow lubricant pressure buildup are taken into consideration.

3. The method according to claim 1, wherein the evaluation values ascertained for multiple engine starts are statistically analysed by means of the analysis unit, wherein the frequency distribution of the evaluation values ascertained for multiple engine starts is ascertained, in the form of a histogram, by means of the analysis unit.

4. The method according to claim 1, wherein the analysis unit has a signalling connection to a warning unit, by means of which a warning signal is independently output to a person operating the apparatus as a function of at least one evaluation value ascertained by means of the analysis unit.

5. The method according to claim 1, wherein the pressure ascertainment unit is formed by at least one pressure sensor for measuring the lubricant pressure.

6. The method according to claim 1, wherein a further evaluation value, which evaluates a lubricant pressure decrease during an engine shutdown procedure, is ascertained by means of the analysis unit from the total of relative travel values ascertained during an engine shutdown procedure or from the total of pressure values ascertained during an engine shutdown procedure.

7. The method according to claim 1, wherein the pressure ascertainment unit, viewed in a lubricant flow direction, is arranged downstream of the lubricant pump and upstream of a friction component region to be lubricated.

8. The method according to claim 1, wherein the lubricant pump is connected in a torque-transmitting manner to a crankshaft of an internal combustion engine as the drive engine, so that the at least one lubricant pump is rotationally drivable by means of the internal combustion engine.

9. The method according to claim 8, wherein the travel ascertainment unit is formed by a crank angle ascertainment unit, by means of which the crank angle covered by the crankshaft since the beginning of the engine start procedure is ascertained to estimate the relative travel between the friction components.

10. The method according to claim 1, wherein for the evaluation of the lubricant pressure buildup by means of the analysis unit as a function of the ascertained total, an evaluation value is selected from a defined number of predefined evaluation values forming different evaluation levels.

11. The method according to claim 10, wherein the predefined evaluation values is in a range of 3 to 6 evaluation values.

12. The method according to claim 1, wherein the number of the pressure points in time is in a range of 2 to 10.

13. The method according to claim 12, wherein the number of the pressure points in time is in a range of 3 to 5.

14. The method according to claim 1, wherein the ascertained evaluation value is stored in a storage unit of the analysis unit either permanently or so the value is readable by means of a readout device.

15. The method according to claim 14, wherein the ascertained evaluation value is stored in the storage unit for a defined period of time, or a defined number of engine starts, or only a part of the evaluation values ascertained for multiple engine starts is permanently stored in the storage unit.

16. A method for evaluating the lubrication of friction components, which rub against one another, of an apparatus which can be lubricated by means of a lubricant circuit, wherein a lubricant pump of the lubricant circuit is drivable by means of a drive engine forming the apparatus or by means of a drive engine driving the apparatus, comprising:
providing a travel ascertainment unit, by means of which the relative travel between the friction components since the beginning of the engine start procedure is continuously ascertained and/or estimated during an engine start procedure, providing a pressure ascertainment unit, by means of which, at multiple travel points in time, at each of which the relative travel ascertained by means of the travel ascertainment unit between the friction partners exceeds a defined relative travel limiting value, the lubricant pressure is ascertained at at least one defined region of the lubricant circuit, and providing an analysis unit, by means of which an evaluation value, which evaluates the lubricant pressure buildup during the engine start procedure, is ascertained from the total of the pressure values ascertained at the travel points in time.

17. The method according to claim 16, wherein the lubricant pump is connected in a torque-transmitting manner to a crankshaft of an internal combustion engine as the drive engine, so that the at least one lubricant pump is rotationally drivable by means of the internal combustion engine.

18. The method according to claim 16, wherein the number of the travel points in time is in a range of 2 to 10.

19. The method according to claim 18, wherein the number of the travel points in time is in a range of 3 to 5.

20. A device comprising:
a lubricant circuit, having a lubricant pump, for lubricating an apparatus, wherein the lubricant pump is drivable by means of a drive engine forming the apparatus or by means of a drive engine driving the apparatus,
a pressure ascertainment unit, by means of which the lubricant pressure can be ascertained at at least one defined region of the lubricant circuit during an engine start procedure,
a travel ascertainment unit, by means of which the relative travel between friction components, which are to be lubricated and rub against one another, of the apparatus since the beginning of the engine start procedure can be ascertained and/or estimated during the engine start procedure, and;
an analysis unit, by means of which an evaluation value, which evaluates the lubricant pressure buildup during the engine start procedure, can be ascertained from relative travel values ($\varphi_1$, $\varphi_2$, $\varphi_3$) ascertained during the engine start procedure or from pressure values ascertained during the engine start procedure.

21. The device of claim 20, wherein the device is incorporated into a vehicle.

22. The device of claim 21, wherein the vehicle is a utility vehicle.

23. The method according to claim 4, wherein the warning signal is an optical or acoustic warning signal.

* * * * *